INVENTORS
WILLIAM B. HALL &
ROBERT F. KELLER
BY J. R. Webb
AGENT

United States Patent Office 3,279,028
Patented Oct. 18, 1966

3,279,028
METHOD OF MANUFACTURING THERMIONIC ENERGY CONVERTER TUBE
William B. Hall, Landisville, and Robert F. Keller, Lancaster, Pa., assignors to Radio Corporation of America, a corporation of Delaware
Filed May 1, 1964, Ser. No. 364,257
11 Claims. (Cl. 29—25.13)

The present invention relates to a thermionic energy converter tube and a method of manufacture thereof.

A thermionic energy converter tube is an electron tube having a thermionic emitter and a collector designed to convert heat energy applied to the emitter into electrical power available at the external terminals of the electrodes. In a practical converter the emitter and collector are made part of the tube envelope, or are thermally coupled thereto, to permit heating the emitter from an external source and cooling the collector by external means. While the current output of such a tube can be made relatively high, of the order of hundreds of amperes, by using a cesium atmosphere in the tube to neutralize the electron space charge, the voltage output is very low, of the order of a volt or less. Therefore, in order to produce a higher voltage, tubes are cascaded in series, like batteries. It has been proposed that the emitters of such a series of tubes be heated from a common heat source by mounting the tubes on a heat duct or pipe adapted to conduct a hot medium, such as liquid lithium, therethrough. This heating pipe, if made of metal, must be electrically insulated from the emitters of the converter tubes, in order to avoid shorting the series of tubes. Also, for best results, the insulation between the pipe and each emitter should also provide a good mechanical and thermal bond therebetween. Previous attempts to make such a bond in a thermionic energy converter tube operable at relatively high temperatures have not been successful.

An object of the present invention is to provide a cast ceramic layer between an electrode of a thermionic energy converter tube and an adjacent heat transfer element that is an electrical insulator and also a mechanical and thermal bond therebetween.

Another object is to provide a bonded assembly of a refractory metal emitter and a refractory metal heat transfer element intimately bonded together in close spaced relation by refractory ceramic insulation cast in the space therebetween, for use in a thermionic energy converter tube.

Figure 1:
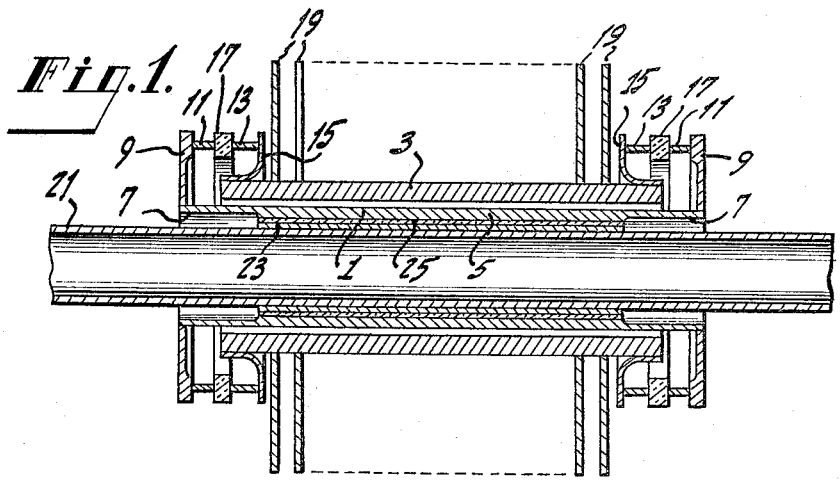
FIG. 1 is an axial sectional view of a thermionic energy converter tube embodying the present invention.

The thermionic energy converter tube shown for example in FIG. 1 comprises a hollow cylindrical thermionic refractory metal emitter 1 coaxially and closely surrounded by a metal collector 3 of similar shape. The emitter 1 comprises a large area thick intermediate portion 5 and two thin end portions 7. The emitter 1 and collector 3, which form parts of the tube envelope, are connected at each end in electrically insulated relation by a series of annular metal members 9, 11, 13 and 15 and a ceramic ring 17 which are brazed or otherwise sealed together and to the emitter and collector to complete the envelope. Preferably, a small amount of cesium is provided within the envelope to be vaporized during operation of the tube. The cesium vapor is ionized, as by impact ionization or contact ionization at the hot emitter surface, to produce positive ions in the discharge space between the emitter and collector, to neutralize the electron space charge and thereby increase the tube current. The collector 3 may be provided with cooling means, such as a plurality of heat radiating fins 19.

The converter tube shown in FIG. 1 is adapted to be mounted in series with similar converters on an elongated metal heat duct or pipe 21. In order to electrically insulate the emitters of the various tubes from the pipe 21, and thus from each other, each tube is provided with a tubular refractory metal heat transfer element 23 insulated from the emitter 1 and adapted to be brazed or otherwise attached to the pipe 21. Refractory heat conducting ceramic insulating material 25 is cast in the narrow space between the emitter 1 and the heat transfer element 23, to provide an intimate mechanical and thermal bond as well as an electrical insulator therebetween. In order to permit operation of the converter with the emitter at a relatively high temperature, of the order of 1100° C. to 1800° C., the emitter 1, ceramic insulation 25 and heat transfer element 23 must have melting points substantially higher than the operating temperature. Moreover, the melting points of the emitter 1 and heat transfer element 23 must be substantially higher than that of the ceramic insulation 25, to permit melting and casting of the insulation 25 between the two metal members. Moreover, the metal is preferably one that does not react chemically with the ceramic material at high operating temperatures, in order to maintain electrical insulation over a long life. The preferred material for the ceramic insulation 25 is sapphire, which is substantially pure aluminum oxide, $Al_2O_3$, and has a melting point of about 2050° C. Molybdenum, which has a melting point of about 2610° C., is preferred for the emitter 1 and heat transfer element 23. Where the insulation is sandwiched between two similar concentric metal members, a small tolerance between the linear coefficients of thermal expansion of the ceramic and metal is permitted. The thermal coefficients of sapphire and molybdenum are, respectively, about $4.9 \times 10^{-6}$ and $8.5 \times 10^{-6}$ inch per inch per degree C. Other refractory ceramic materials that can be used (with approximate properties) include:

| Ceramic Material | Melting Point | Coefficient |
|---|---|---|
| Mullite ($3Al_2O_3 \cdot 2SiO_2$) | 1,830 | 5.3 |
| Forsterite ($Mg_2SiO_4$) | 1,910 | 10.5 |
| High Alumina (85+% $Al_2O_3$) | 2,000 | 6.5 |
| Beryllia (BeO) | 2,530 | 7.5 |
| Zirconia ($ZrO_2$) | 2,700 | 6.6 |

Other refractory metals that can be used for the emitter 1 and element 23 (with approximate properties) include:

| Metal | Melting Point | Coefficient |
|---|---|---|
| Iridium | 2,454 | 6.8 |
| Tantalum | 2,996 | 6.5 |
| Rhenium | 3,180 | 6.7 |
| Tungsten | 3,410 | 4.6 |

Figure 2:
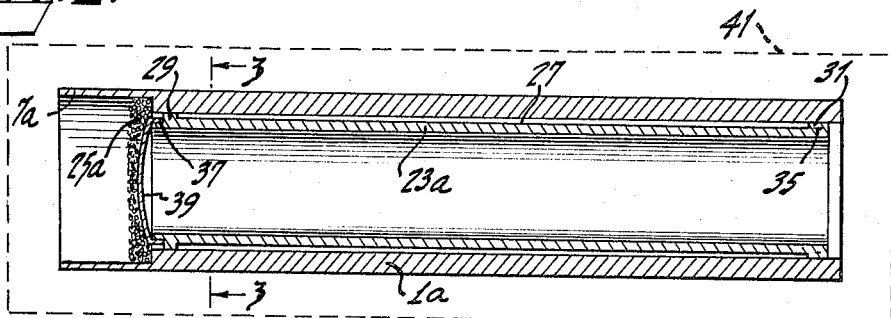
FIG. 2 is an enlarged axial sectional view of the emitter and heat transfer element of FIG. 1 in an intermediate stage in the manufacture thereof.
Figure 3:
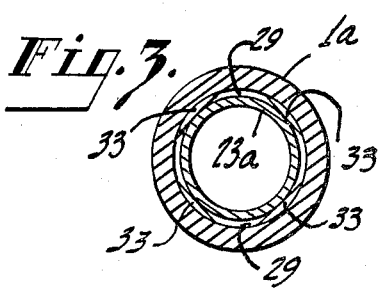
FIG. 3 is a transverse sectional view taken on line 3—3 of FIG. 2.

A method of casting the sapphire or other ceramic insulation 25 is illustrated in FIG. 2. First, a hollow cylinder 1a of molybdenum for example, having the length and radial dimensions of the emitter 1, is counter-bored at 7a at one end for depth about three-fourths of the length of the end portions 7 (FIG. 1). A piece of molybdenum tubing 23a having a length greater than and an inner diameter equal to element 23, and an outer diameter equal to the inner diameter of tubing 23a, is turned down intermediate its ends at 27 to the final outer diameter of element 23, leaving outwardly-extending locating flanges or bosses 29 and 31 near the ends. The flange 29 is flattened or otherwise provided with passageways 33 therethrough, as shown in FIG. 3. Similar passageways 35 may also be provided in the other flange 31. The flange 29 is spaced slightly from the end of tubing 23a which is undercut at 37 to receive an end cap 39, of refractory metal, which may also be molybdenum.

The inner tubing 23a and end cap 39 mounted thereon are positioned within the outer tubing 1a with the cap 39 adjacent to the bottom of the counterbore 7a. A mass of chips or pieces of sapphire is placed on the cap 39 and counterbore 7a, and the assembly is positioned in a hydrogen furnace, schematically indicated by the dashed box 41, in a vertical position. The assembly is heated somewhat above the melting point of the sapphire, to a temperature, between 2060° C. and 2400° C., at which the molten $Al_2O_3$ flows through the passageways 33 in the locating flange 29 into the narrow space between the emitter tubing 1a and the heat transfer tubing 23a by capillary action. Sufficient chips are supplied for the molten material to completely fill this space. The surface tension and capillary action of the $Al_2O_3$ are such that the excess flows out the bottom, if passageways 35 are provided, but the space between two tubings remains full. As the temperature is held above the melting point of the $Al_2O_3$, gases evolved from the metals and trapped $H_2$ flow to the surface and are replaced by $Al_2O_3$. After the space is filled, the furnace temperature is preferably reduced slowly to 1900° C., after which the assembly is cooled to room temperature as rapidly as possible to obtain a clear alpha alumina (sapphire).

Figure 4:
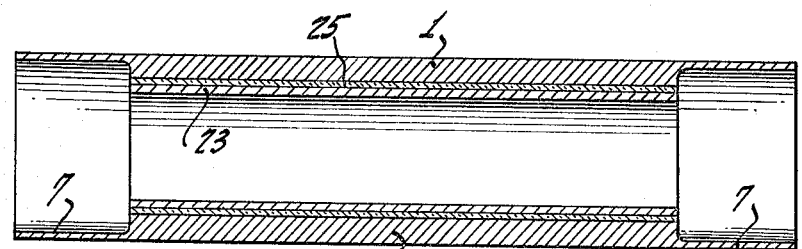
FIG. 4 is a view similar to FIG. 2 of the finished assembly of the emitter and heat transfer element, ready for mounting in the tube of FIG. 1.

After cooling, the bonded assembly of FIG. 2 is machined to the final design, shown in FIG. 4. This involves removing the cap 39 and flanges 29 and 31 and forming the thin end portions 7, thus leaving the inner heat transfer element 23 firmly bonded mechanically and thermally to, but electrically insulated from, the cathode 1 by the cast ceramic insulation 25. A test used to measure the interface bond is with ultrasonic waves that are completely blocked by the slightest interface void. It was found that bonds made by the above-described process transmitted such sound waves therethrough with no detectable interference.

Examination of bonded assemblies of molybdenum and sapphire indicates that the bond is primarily a mechanical one, involving very little if any chemical action. On the other hand, bonds using more reactive refractory metals or alloys, such as an alloy of molybdenum, titanium and zirconium, show evidence of the presence of some chemical bonding also.

As an example, the outer cylinder or emitter 1 may be 4″ long and 100 mils thick, with end portions .600″ long and 15 mils thick. The inner cylinder or heat transfer element may be 2.8″ long and 50 mils thick, after trimming. The flanges 29 and 31 may be 60 to 100 mils wide. The spacing between the cylinders may be from 3 to 20 mils, and is preferably about 5 mils.

If desired, the emitter 1 could be insulated and bonded directly to the heat duct or pipe 21, by casting ceramic insulation therebetween. Moreover, other shapes than hollow cylindrical members may be bonded by the bonding techniques described above, using correlated shapes that facilitate capillary flow, such as flat, square or triangular shapes.

In some cases it may be desirable to cool the collectors of a plurality of tubes by thermally connecting the collectors to a single cooling element. This arrangement also requires electrical insulation of each collector from the heat transfer element. Such insulation together with mechanical and thermal bonding may also be produced by the method described above. However, in this case, since the collector of a thermionic energy converter tube normally operates at substantially lower temperature than the emitter, the ceramic and metals involved may have somewhat lower melting points. For example, for a maximum collector temperature of 800° C., a ceramic having a melting point (M.P.) of at least 1000° C. would be satisfactory. This would include quartz with a melting point of 1400–1700° C. and a coefficient of about $4.6 \times 10^{-6}$, and fused $SiO_2$ with a melting point of about 1700° C. and a coefficient of about $8.6 \times 10^{-6}$. The collector and the cooling element (or intermediate heat transfer element) could be of titanium (M.P. 1668° C.), zirconium (M.P. 1852° C.) or chromium (M.P. 1875° C.). All of these metals have thermal coefficients of about $9 \times 10^{-6}$ per deg. C., or less, and hence, close enough to the ceramic materials to be usable therewith. Of course, the collector must have a melting point substantially higher than the ceramic used, and must also be of a metal that is compatible with the cesium vapor in the tube, if such is used. All of the metals named above are "refractory," in that they have very high melting points, above the range of iron (1536° C.), cobalt (1495° C.) and nickel (1453° C.).

We claim:
1. A method of making a thermionic energy converter tube including a thermionic emitter of refractory metal thermally and mechanically bonded to but electrically insulated from a refractory metal heat transfer element of similar shape comprising the steps of:
   (a) telescopically and vertically supporting said emitter and said element with close and uniform spacing therebetween;
   (b) supporting a quantity of refractory heat conducting ceramic material at one boundary of the space between said emitter and element;
   (c) heating the assembly of said emitter, element and material in a non-oxidizing atmosphere to a temperature sufficient to melt said material and cause it to flow by capillary action into and fill said space; and
   (d) cooling said assembly to solidify said ceramic material and form a bond between said emitter and element.

2. A method as in claim 1, wherein
   (a) said ceramic material has a melting point of at least 1800° C.; and
   (b) each of said emitter and heat transfer element is made of a metal which has a melting point substantially higher than said ceramic material.

3. A method as in claim 2, wherein said
   (a) said ceramic material is substantially pure aluminum oxide;
   (b) said metal is molybdenum; and
   (c) said temperature is 2060° C. to 2400° C.

4. A method as in claim 3, wherein said assembly is cooled slowly to about 1900° C., and then rapidly to room temperature.

5. A method of making a thermionic energy converter tube including a hollow cylindrical electrode of refractory metal thermally and mechanically bonded to but electrically insulated from a hollow cylindrical heat transfer element of refractory metal, comprising the steps of:
   (a) supporting said heat transfer element vertically within, and in concentric close spaced relation with, said electrode;
   (b) supporting a quantity of a heat conducting ceramic material at one boundary of the space between said electrode and said heat transfer element;
   (c) heating the assembly of said electrode, element and material in a non-oxidizing atmosphere to a temperature sufficient to melt said material and cause it to flow by capillary action into and fill said space; and
   (d) cooling said assembly to solidify said ceramic material and form a bond between said electrode and element.

6. A method of making a thermionic energy converter tube having a hollow cylindrical thermionic emitter of refractory metal thermally and mechanically bonded to but electrically insulated from a cylindrical heat transfer element of refractory metal, comprising the steps of:

(a) supporting said element vertically and concentrically within said emitter in close-spaced relation therewith;

(b) supporting a quantity of a refractory heat conducting ceramic material at one end of said heating element and adjacent to said emitter;

(c) heating the assembly of said emitter, element and material in a non-oxidizing atmosphere to a temperature sufficient to melt said material and cause it to flow by capillary action into and fill the space between said emitter and said element; and (d) cooling said assembly to solidify said ceramic material and form a bond between said emitter and element.

7. A method as in claim 6, wherein said heat transfer element is supported concentrically within said emitter by outwardly extending bosses on each end of said element, and said bosses are removed after said assembly is cooled.

8. A method as in claim 6, wherein said element is a hollow sleeve having an end cap forming said one end, and said end cap is removed after said assembly is cooled.

9. A method as in claim 6, wherein (a) said ceramic material has a melting point of at least 1800° C.; and (b) said emitter and heat transfer element are made of a metal which has a melting point substantially higher than said ceramic material.

10. A method as in claim 9, wherein (a) said ceramic material is substantially pure aluminum oxide;

(b) said metal is molybdenum; and (c) said temperature is 2060° C. to 2400° C.

11. A method as in claim 10, wherein said assembly is cooled slowly to about 1900° C., and then rapidly to room temperature.

References Cited by the Examiner

UNITED STATES PATENTS

| | | | |
|---|---|---|---|
| 2,947,114 | 8/1960 | Hill | 161—225 X |
| 2,985,946 | 5/1961 | Dewijer | 29—25.14 |
| 3,005,766 | 10/1961 | Bartnoff. | |
| 3,132,409 | 5/1964 | Freeman | 29—25.14 |
| 3,132,410 | 5/1964 | Cohen | 29—25.14 |
| 3,176,164 | 3/1965 | Beggs | 310—4 |
| 3,187,205 | 6/1965 | Martini | 310—4 |

JOHN F CAMPBELL, *Primary Examiner.*

W. I. BROOKS, *Examiner.*